United States Patent

Friese et al.

[11] Patent Number: 5,473,304
[45] Date of Patent: Dec. 5, 1995

[54] METHOD OF PROTECTING CATALYTIC CONVERTERS FOR EXHAUST GAS PURIFICATION AND HEAT TONE SENSOR FOR IMPLEMENTING THE METHOD

[75] Inventors: Karl-Hermann Friese, Leonberg; Hans-Martin Wiedenmann; Gerhard Hoetzel, both of Stuttgart, all of Germany

[73] Assignee: Robert Bosch GmbH, Stuttgart, Germany

[21] Appl. No.: 971,904

[22] PCT Filed: May 8, 1993

[86] PCT No.: PCT/DE91/00447

§ 371 Date: Dec. 28, 1992

§ 102(e) Date: Dec. 28, 1992

[87] PCT Pub. No.: WO92/00446

PCT Pub. Date: Jan. 9, 1992

[30] Foreign Application Priority Data

Jun. 27, 1990 [DE] Germany .......... 40 20 383.2

[51] Int. Cl.⁶ .................................. H01C 7/10
[52] U.S. Cl. .................. 338/23; 338/25; 338/34
[58] Field of Search .................. 338/22 R, 23, 338/25, 34; 123/549, 552, 557; 340/584; 374/185; 29/612; 73/23.31, 31.05; 60/274, 276, 285

[56] References Cited

U.S. PATENT DOCUMENTS

| | | | |
|---|---|---|---|
| 3,915,125 | 10/1975 | Henkel et al. | 123/3 |
| 3,949,551 | 4/1976 | Eichler et al. | 60/274 |
| 4,024,850 | 5/1977 | Peter et al. | 123/198 F |
| 4,654,624 | 3/1987 | Hagan et al. | 338/34 |
| 4,703,555 | 11/1987 | Hübner | 338/34 X |
| 5,181,007 | 1/1993 | Friese et al. | 338/22 R |

*Primary Examiner*—Marvin M. Lateef
*Attorney, Agent, or Firm*—Spencer, Frank & Schneider

[57] ABSTRACT

A method is disclosed for the protection of catalytic converters for exhaust gas purification by measuring the temperature with a heat tone sensor suitable particularly for the implementation of the method, wherein a heat tone sensor composed of at least two NTC or PTC resistors and provided with a coating of a catalytically active material on the sensor in the region of at least one of these resistors is arranged ahead of the catalytic converter in the exhaust gas stream or a part thereof, with the catalytically active material initiating the same exothermal reactions as they take place in the catalytic converter employed for the exhaust gas purification. If the resistor is overheated due to an overly intensive exothermal reaction, resulting in a change in resistance, the heat tone sensor detects the drop in the throughput rate of the catalytic converter.

15 Claims, 4 Drawing Sheets

METHOD OF PROTECTING CATALYTIC CONVERTERS FOR EXHAUST GAS PURIFICATION AND HEAT TONE SENSOR FOR IMPLEMENTING THE METHOD

BACKGROUND OF THE INVENTION

The invention is based on a method of protecting catalytic converters for exhaust gas purification by measuring the temperature with a heat tone sensor and to a heat tone sensor for implementing the method. The method and the heat tone sensor for implementing the method are particularly suitable for use in motor vehicles.

The exhaust gas of motor vehicle internal-combustion engines includes, among others, carbon monoxide, nitrous oxides and non-combusted or partially combusted hydrocarbons which contribute to air pollution. To decrease air pollution caused by these substances to a minimum value, it is necessary to substantially eliminate these substances from the exhaust gases of motor vehicle internal-combustion engines. This is done by converting the noxious components of the exhaust gas to the non-noxious compounds carbon dioxide, nitrogen and water in that the exhaust gases are subjected to further combustion conducted over catalysts at temperatures above about 600° C.

The service life of such catalytic converters is limited. This means that their catalytic activity decreases more or less rapidly after a certain time and the exhaust gases thus may reach the atmosphere in their unpurified state. Since, however, the legal regulations for exhaust gases must always be compiled with during the entire time the vehicle is in use, it is recommended to monitor the proper operation of the catalytic converter. This monitoring system must indicate to the driver by way of an optical or acoustic signal that the catalytic converter no longer operates properly.

One possibility of directly monitoring the catalytic converter is by measuring the decomposition of one or several components of the contaminants, in which case their concentration is measured once upstream and once downstream of the catalytic converter so that the difference in concentration can be used as a measure for the proper operation of the catalytic converter. However, measuring these contaminant components is relatively expensive and difficult.

German Patent 2,643,739 further discloses a method of monitoring the activity of catalytic converters for exhaust gas purification by measuring the temperature with temperature sensors. In this method, a temperature comparison measurement is made with the aid of two temperature sensors which measure the heat tone developed by the reaction taking place in the catalytic converter and, if there is a temperature difference as an indication that the catalytic converter is no longer able to operate properly, causes a warning signal to be emitted.

In the prior art method, two temperature sensors are advantageously employed for the temperature measurements. One of the temperature sensors has a catalytically active surface, the other, however, has a catalytically inactive surface. Both temperature sensors are arranged in the gas chamber in close proximity to one another, but without contacting one another, within the catalytic converter system or shortly downstream of it.

SUMMARY OF THE INVENTION

The method according to the present invention comprises a method of using a heat tone sensor for protecting a catalytic converter used for exhaust gas purification by detecting hazardous operating conditions which method includes the steps of: providing a heat tone sensor comprising at least two NTC or PTC resistors, with a coating of a catalytically active material being provided on the sensor in the region of at least one of the resistors, and with the catalytically active material initiating identical exothermal reactions as those which take place in the catalytic converter; disposing the heat tone sensor in at least a part of an exhaust gas stream flowing through the catalytic converter upstream of the catalytic converter, whereby the catalytically active material initiates identical external reactions as those which take place within the catalytic converter; through use of the heat tone sensor, detecting a deviation of the exhaust gas composition from a change in resistance in the resistor disposed in the region of the catalytic coating due to overheating of the resistor resulting from an excessive exothermal reaction; and taking counter measures when a threshold value of resistance change is exceeded.

Compared to the prior art methods, and particularly compared to the method disclosed in German Patent 2,643,739, the method according to the invention has the advantage that the heat tone effect, which may damage the catalytic converter due to overheating if the exothermal reactions are too strong, for example due to misfiring, is utilized already upstream of the catalytic converter in a heat tone sensor at which the same exothermal reactions are catalytically initiated.

Heat tone sensors particularly suitable for implementation of the method according to the invention are planar sensors that are constructed according to ceramic film technology. Preferably, the heat tone sensors employed according to the invention are equipped with one or two identical NTC [Negative Temperature Coefficient] or PTC [Positive Temperature Coefficient] resistors which is (are) part of a bridge circuit that is detuned when the one resistor is overheated due to the occurrence of a strong exothermal reaction and the changes in resistance connected with it.

The invention thus avoids the problem-fraught installation of a monitoring sensor, for example a temperature sensor, in the catalytic exhaust gas converter itself.

NTC temperature sensor elements produced according to ceramic film technology, employable as heat tone sensors for use in the exhaust gas system of internal-combustion engines and equipped with an NTC resistor and conductor path which connect the NTC resistor with electrical contact surfaces are disclosed, for example, in DE-OS [Unexamined Published German Patent Application] 3,733,193. They are composed of a composite laminate of ceramic films in such a manner that the ambient air or electrolytically pumped-in oxygen has free access by way of a channel that is possibly filled with a porous material to the NTC resistor composed of a conductive material of $O^{2-}$ ions while the NTC resistor itself is hermetically sealed from the gas being measured.

PTC temperature sensor elements produced according to ceramic film technology and usable as heat tone sensors equipped with a PTC resistor for use in the exhaust gas systems of internal-combustion engines are disclosed, for example, in DE-OS 3,733,192.

They are composed of a composite laminate of ceramic films in which the PTC resistor and its conductor paths are hermetically encapsulated against the gas being measured and the ambient air.

The heat tone sensors employed to implement the method of the invention essentially differ from the planar temperature sensor elements disclosed, for example, in DE-OS 3,733,192 and 3,733,193 in that at least one exterior surface of a temperature sensor element of the heat tone sensor is coated with catalytically active material at which the same exothermal reactions are initiated which also take place in the catalytic converter employed for the exhaust gas purification.

The application of the catalytically active material may take place in various ways.

One suitable method of applying the catalytically active material resides in initially sintering onto at least a partial region of an exterior surface of the temperature sensor element a porous engobe layer of conventional, known composition, e.g., of 60 weight % $Al_2O_3$ and 40 weight % $ZrO_2$; 60 weight % $Al_2O_3$ and 40 weight % $CeO_2$; or 100 weight % $CeO_2$. Possibly a stabilizer may be added, for example $Y_2O_3$, for example in a concentration of 4 mole %, with reference to the $ZrO_2$ or $CeO_2$ percentage. The engobe layer may here be produced by applying a pasty coating substance according to thick-film technology. On the other hand, however, the engobe layer may also be produced in a lamination process by means of a porously sintering ceramic film of appropriate composition. The application of the catalytically active material may then take place by subsequent treatment with the catalytically active material as it is generally known for the production of catalytic exhaust gas converters, for example by the use of finely dispersed "wash coatings", based, for example, on boehmite and by impregnation with a catalyst material based, for example, on Pt—Rh (see "Advances in Catalysis", Volume 36, pages 62 et seq , Academic Press, Inc., San Diego, 1989).

A second suitable method for applying the catalytically active material resides in directly adding the catalytically active material, e.g. a Pt or Pt-alloying powder or a precatalyst material, e.g. metal-organic compounds from which catalytically active materials are formed during the sintering process to the material employed to produce the engobe layer.

A third suitable method for applying the catalytically active material resides in applying, on at least a partial region of an exterior surface of the temperature sensor element, a plasma-sprayed porous cover layer, for example an Mg spinel layer or a layer of the composition given for the engobe layers. A catalyst or precatalyst material, for example a Pt or Pt-alloying powder or metal-organic compounds from which catalytically active materials are produced during the sintering or plasma spraying process may again be added to the plasma spraying material.

Preferably 0.5 to 30 volume %, particularly 5 to 10 volume % of catalyst material are added to the plasma spraying material or to the material employed to produce the engobe layer.

The addition of catalyst material to the plasma spraying material or to the material employed to produce the engobe layer has the advantage, compared to subsequent treatment of an initially produced engobe layer or plasma-sprayed cover layer, of an increased service life at excess temperatures. The catalytic activity, however, is generally somewhat lower.

In the simplest case, the heat tone sensor employed to implement the method according to the invention is thus composed of a temperature sensor element equipped with an NTC or PTC resistor and provided on at least a partial region of one of its two exterior surfaces with a coating of a catalytically active material as described above.

According to a first advantageous embodiment of the invention, the method according to the invention is implemented in that a heat tone sensor is employed in which a temperature sensor element of the described type (temperature sensor element 1) is combined with a further temperature sensor element (temperature sensor element 2). However, in contrast to temperature sensor element 1, temperature sensor element 2 has no catalytically active surface. Both temperature sensor elements may here be separated from one another by a spacer composed, for example, of a ceramic substrate and may be accommodated in a customary sensor housing.

In that case, temperature sensor element 1 serves to indicate the temperature of the exhaust gas, while temperature sensor element 2 serves to detect the heat tone of the catalytically initiated exhaust gas reactions.

According to a second, advantageous embodiment of the invention, a heat tone sensor is employed which is provided with two temperature sensor elements of the described type but in monolithic configuration, with the heat tone sensor being produced by laminating together the individual films forming the two temperature sensor elements.

Preferably temperature sensor elements 1 and 2 are separated by a porously sintering ceramic film, e.g. based on $ZrO_2$, including an added pore former, e.g., additional theobromine. The porously sintering ceramic sheet in the heat tone sensor here acts as a heat damming layer between the two temperature sensor elements.

According to a third, advantageous embodiment of the invention, the method according to the invention is implemented by means of a heat tone sensor equipped with two temperature sensor elements of the described type which this time are not arranged one on top of the other but parallel to one another.

According to a fourth embodiment of the invention, the method according to the invention is implemented by means of a heat tone sensor composed of a temperature sensor element that is provided on its exterior surface with a coating of a catalytically active material and a heated λ sensor element. In this case, the internal resistance of the λ sensor element, which is separated from the temperature sensor element by way of a ceramic substrate as spacer, serves as a reference resistor. The air reference channel for the λ sensor element may here be stamped into the ceramic film serving as the spacer.

According to a fifth advantageous embodiment of the invention, a heat tone sensor is employed to implement the method according to the invention in the same way as in the case of the fourth embodiment but in monolithic configuration, preferably including a porously sintering film between the temperature sensor element and the λ sensor element. The porously sintering film may here be composed, for example, of a porously sintering $ZrO_2$ ceramic film. The porously sintering ceramic film here acts as a heat damming layer between the two sensor elements. The exhaust gas electrode lies in the region of the porously sintering film through whose pores the exhaust gas enters; the reference electrode lies in the reference channel which is hermetically sealed against the exhaust gas. The heater disposed thereabove heats both electrodes.

BRIEF DESCRIPTION OF THE DRAWINGS

The drawing figures serve to illustrate the invention in greater detail and include the following figures wherein:

FIG. 7b is a top view of the embodiment shown in FIG. 7a.

For the sake of simplicity, the sensor housings in which the heat tone sensors are accommodated have been omitted. Suitable housings are known, e.g. of tinderproof steel.

DETAILED DESCRIPTION OF THE PREFERRED EMBODIMENTS

Figure 1:
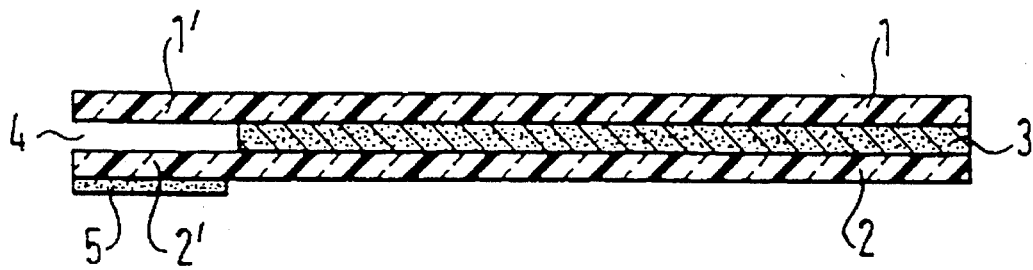
FIG. 1 is a schematic sectional view of a heat tone sensor suitable for implementing the method according to the invention.

The heat tone sensor shown schematically in FIG. 1 is composed of two temperature sensor elements 1 and 2, for example NTC temperature sensor elements of the type disclosed in DE-OS 3,733,192 or PTC temperature sensor elements of the type disclosed in DE-OS 3,733,193. The two temperature sensor elements are here separated from one another by means of a spacer 3. Spacer 3 is advantageously composed of a ceramic substrate, e.g., an $Al_2O_3$ film.

The position of the resistors is indicated as 1' and 2', respectively.

In the case of the embodiment shown in FIG. 1, the exterior surface of temperature sensor element 2 is provided with a catalytically active coating 5 in the region of its resistor element 2'. If necessary, the oppositely disposed surface of temperature sensor element 2 may also be provided with a catalytically active coating in the region of exhaust gas channel 4.

In the case of this embodiment, temperature sensor element 1 serves to indicate the temperature of the exhaust gas and temperature sensor element 2 detects the heat tone of the catalytically initiated exhaust gas reactions. For the sake of simplicity, the temperature sensor terminals are omitted, as are those of the embodiment shown in FIG. 2.

Figure 2:
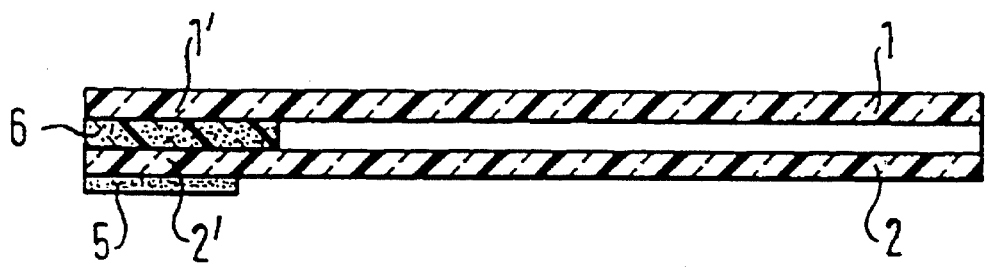
FIG. 2 is a schematic sectional view of a heat tone sensor suitable for implementation of the method according to the invention in monolithic configuration.

The heat tone sensor shown schematically in FIG. 2 differs from the heat tone sensor shown in FIG. 1 essentially by its monolithic configuration. While in the case of the heat tone sensor shown in FIG. 1 two temperature sensor elements are combined into a heat tone sensor through the intermediary of a spacer 3, the heat tone sensor shown in FIG. 2 is obtained by laminating together and then sintering together corresponding films as will be described in greater detail below in connection with FIG. 4.

The heat tone sensor shown in FIG. 2 is produced in that a porously sintering ceramic film 6, e.g. a $ZrO_2$ film, which contains a pore former, e.g. theobromine, or another substance that burns away, decomposes or evaporates under sintering conditions, is placed between the films forming the two temperature sensor elements 1 and 2. The porously sintering ceramic film 6 then acts as a heat damming layer between the two temperature sensor elements 1 and 2 in the heat tone sensor.

Figure 3:
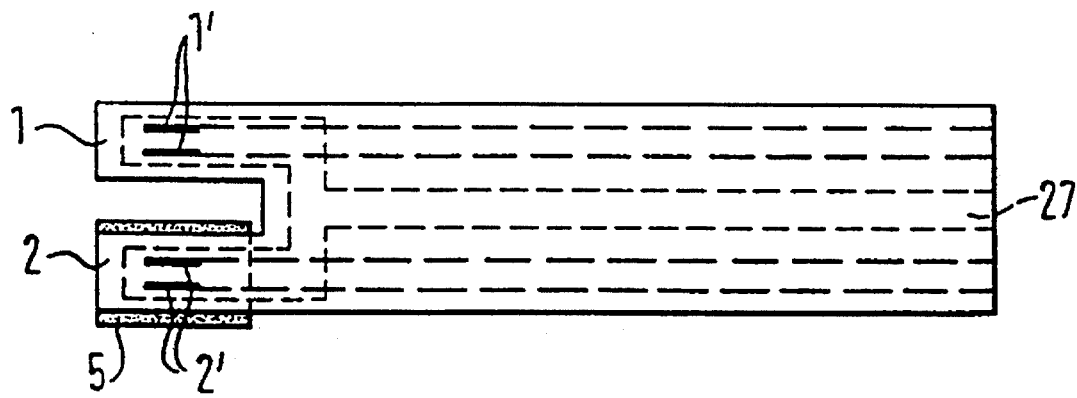
FIG. 3 is a schematic top view of a heat tone sensor in monolithic configuration suitable for implementing the method according to the invention in which the temperature sensor elements are arranged in parallel, and wherein the heat tone sensor is part of a bridge circuit.

In the embodiment shown schematically in FIG. 3 which has a monolithic configuration and is provided with an air reference channel 27, temperature sensor elements 1 and 2 are arranged parallel to one another. In the case of the illustrated embodiment, only temperature sensor element 2 is provided with a catalytically active coating 5. If necessary, a similar coating but without catalytically active substances may also be applied to temperature sensor element 1.

The temperature sensing resistors 1' and 2' are part of a bridge circuit. For pick-up of the measuring signal, at least one resistor of the bridge circuit other than the resistors 1' and 2' is changed until the bridge circuit is balanced in that there is zero indication on a measuring instrument connected across the diagonal of the bridge in a conventional manner. Changes in this measured signal caused by changes in resistance of the catalytically coated resistor, for example, due to changes in the exhaust gas composition, are used to initiate countermeasures to protect the catalytic converter when a threshold value of resistance change is exceeded.

Figure 4:
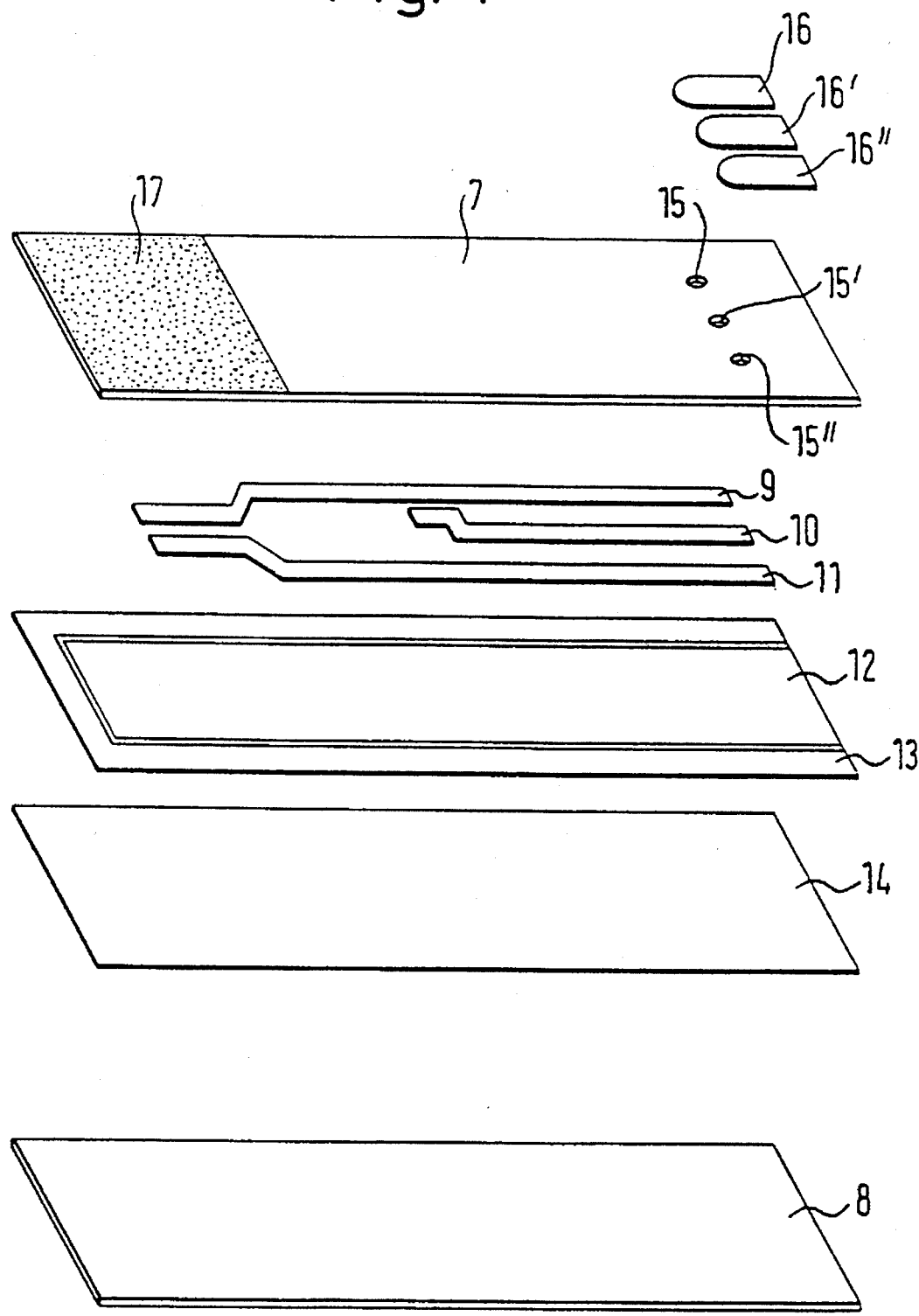
FIG. 4 is a schematic representation of a heat tone sensor suitable for implementing the method according to the invention.

FIG. 4 illustrates the configuration of a heat tone sensor in monolithic configuration suitable for implementation of the method according to the invention in which two temperature sensor elements are integrated in one heat tone sensor, with one temperature sensor element being provided with a catalytically active coating.

In detail, the heat tone sensor is composed of the two films 7 and 8, made, e.g., of $ZrO_2$ (YSZ) that has been stabilized with $Y_2O_3$, leads 9, 10 and 11, e.g., Pt or Pd/Pt cermet layers, of the porously sintering insulating layer 12, e.g., of $Al_2O_3$, preferably together with a pore former, for example, theobromine and, a sealing frame 13 made, e.g., of $Y_2O_5$ stabilized $ZrO_2$, and of an intermediate layer 14, e.g., of $Y_2O_3$ stabilized $ZrO_2$.

In the case of this heat tone sensor, the NTC temperature sensor element 1 is formed of film 7 and leads 9 and 10, while heat tone sensor element 2 is formed of film 7 and leads 9 and 11.

Film 7 is provided with through contacts 15, 15' and 15" as well as electrical contact faces 16, 16' and 16" and in region 17 its exterior surface is covered with catalytically active material. If necessary, a coating of catalytically active material may be provided on the exterior surface of film 8 opposite region 17.

In the case of the illustrated heat tone sensor, air is supplied through the porously sintering layer 12. The air supply may, however, also be effected through an air supply channel stamped into the film.

Figure 5:
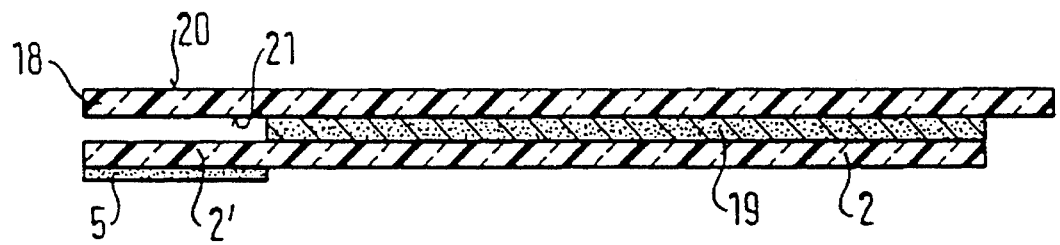
FIG. 5 is a schematic sectional view of a further embodiment of a heat tone sensor suitable for implementing the method according to the invention.

The heat tone sensor shown schematically in FIG. 5 for the implementation of the method according to the invention is composed of a temperature sensor element 2 equipped with a catalytically active coating 5 and a heatable λ sensor element 18 that is separated from temperature sensor element 2 by a ceramic substrate 19 serving as spacer. The λ sensor element 18 including a heater side 20 and a sensor side 21 is further provided with two non-illustrated heater terminals and two non-illustrated sensor terminals and temperature sensor element 2 is provided with two non-illustrated temperature sensor terminals.

Figure 6:
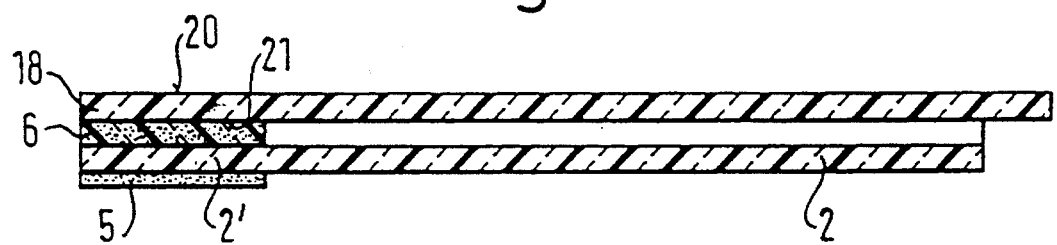
FIG. 6 is the embodiment of a heat tone sensor as shown in FIG. 5, but in monolithic configuration.

The heat tone sensor, shown schematically in FIG. 6, for implementing the method according to the invention essentially differs from the heat tone sensor shown in FIG. 5 by its monolithic configuration. It is again composed of a temperature sensor element 2 having a catalytically active coating 5 and a λ sensor element 18 as well as a porously sintering ceramic film 6 which serves as spacer, e.g. a $ZrO_2$ ceramic film. The production of such a heat tone sensor is effected by laminating together the films required to construct the two elements, with at least two films being required to construct the λ sensor element and again at least two films to construct the temperature sensor element. The porously sintering film 6 serving as spacer again serves as a heat damming layer between the sensor elements and here simultaneously as a protective layer for the exhaust gas electrode of the λ sensor element.

Figure 7A:
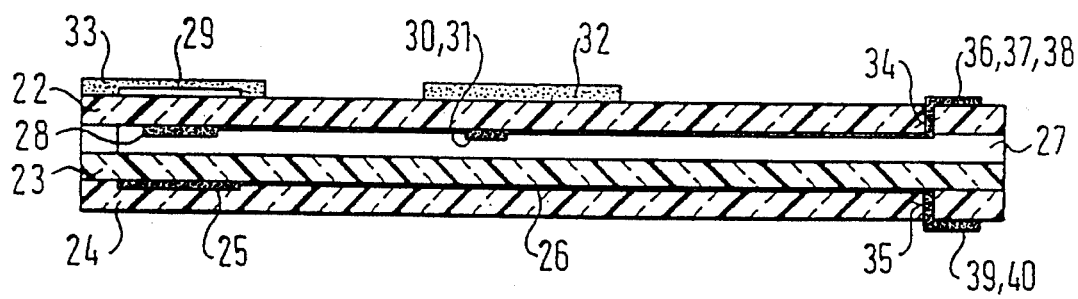
FIG. 7a is a schematic sectional view of a further embodiment of a heat tone sensor suitable for implementing the method according to the invention.
Figure 7B:
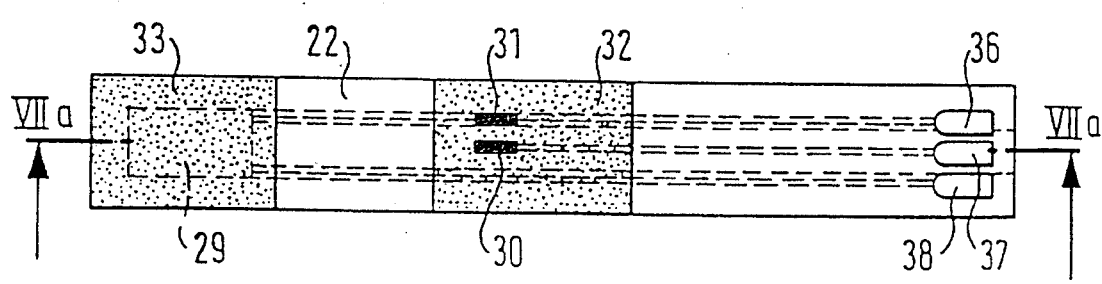

The heat tone sensor shown schematically in FIGS. 7a and 7b for implementing the method according to the invention constitutes an economical combination of a heatable λ sensor element and a temperature sensor element. The heat tone sensor is essentially composed of the laminated-together films 22, 23 and 24, a heater 25 including heater leads 26, an air reference channel 27, an interior electrode 28, an exterior electrode 29, an NTC resistor 30, a catalytic coating 32 and a porous protective layer 33, e.g. an Mg spinel layer above exterior electrode 29. Film 22 is further provided with two through contacts 34 for the leads of NTC resistor 30 and for a lead from interior electrode 28 which is connected with an NTC resistor lead; film 24 and two through contacts 35 for heater leads 26. The electrodes, the sensor cell and the NTC resistor are electrically connected by way of electrical contacts 36, 37 and 38 and the heater is connected by way of contacts 39 and 40 on the opposite side of the sensor element.

Ceramic films based on a solid electrolyte and on isolator ceramics are suitable for the production of the planar heat tone sensors of the type described above that can be employed according to the invention and so are processes and methods for coating, contacting, laminating, sintering, etc., as they are disclosed in DE-OS 3,733,192 and 3,733, 193 for the production of temperature sensor elements. In the case of the combination of a temperature sensor element with a λ sensor element, the λ sensor element may be produced according to methods disclosed, for example, in EP 0,309,067.

The heat tone sensors according to the invention can be accommodated in conventional housings as they are disclosed in greater detail, for example, in DE-OS 3,206,903.

EXAMPLE

A heat tone sensor of the configuration shown in FIG. 4 was produced on the basis of two $Y_2O_3$ stabilized $ZrO_2$ basic films each having a thickness of 0.5 mm. Initially, through-contacting holes 15, 15' and 15" were punched into film 7 in a known manner, through-contacts were made and electrical contact faces 16, 16' and 16" were printed on. On the side of film 7 opposite these electrical contact faces, the electrical leads 9, 10 and 11 as well as insulating layer 12 and the hermetically sealing frame 13 were applied by printing. The film 7 imprinted in this manner was then laminated together with a film 8 that had been imprinted with an interlaminar binder layer 14. After forming the composite body by laminating and applying the catalytically active coating 17, the composite body was sintered by heating for four hours to a temperature of about 1400° C.

The through-contacts were produced in that an $Al_2O_3$ insulating layer was introduced first into the stamped-out through-contacting holes 15, 15' and 15" and above it an electrically conductive $Pt/Al_2O_3$ layer.

A paste made of a mixture of Pt and $Nb_2O_5/YSZ$ was employed to print on the electrical contact faces.

Pt cermet or Pt-alloying cermet pastes served to produce the electrical leads 9, 10 and 11.

Layer 12 was composed of an approximately 50 μm thick porously sintering theobromine-containing $Al_2O_3$ printed layer provided with a sealing frame 13 for the hermetic seal of resistors made of $Y_2O_3$ stabilized $ZrO_2$ and formed by means of electrical leads 9, 10 and 11. Layer 14 was composed of $Y_2O_3$ stabilized $ZrO_2$ and had a thickness of about 20 μm.

During the sintering process, the theobromine burned while forming a porous layer giving the air access to the resistors. However, the access of air may of course also be effected by way of an air channel that has been punched into a film placed between films 7 and 8.

The application of the catalytically active coating 17 was effected in that, after the lamination process, a Pt-YSZ cermet layer was printed on and above it a porously sintering YSZ protective layer including theobromine as a pore former.

After the sintering process, the layer thickness of the catalytically active coating was about 20 μm with a protective layer of about 30 μm.

The composite body subjected to the sintering process was then encased in a housing of a type disclosed in DE-OS 3,206,903, with the two resistors of the temperature sensor elements formed by means of leads 9, 10 and 11 being part of a Wheatstone bridge circuit which was detuned if the one resistor is overheated due to a strong exothermal reaction and the resulting change in resistance.

We claim:

1. A method of using a heat tone sensor for protecting a catalytic converter used for exhaust gas stream purification by detecting hazardous operating conditions comprising the steps of:

providing a heat tone sensor comprising at least two NTC or PTC resistors with a coating of a catalytically active material being provided on the sensor in a region of at least one of the resistors, and with the catalytically active material initiating identical exothermal reactions as those which take place in a catalytic converter;

disposing the heat tone sensor in at least a part of an exhaust gas stream flowing through the catalytic converter upstream of the catalytic converter so that the catalytically active material initiates identical external reactions as those which take place within the catalytic converter;

detecting a deviation of the exhaust gas composition from a change in resistance in the resistor disposed in the region of the catalytic coating due to overheating of the resistor resulting from an excessive exothermal reaction; and, taking countermeasures to protect the converter when a threshold value of resistance change is exceeded.

2. A method according to claim 1, wherein the heat tone sensor is equipped with two identical NTC or PTC resistors that are part of a balanced bridge circuit which is detuned if the one resistor is overheated due to a strong exothermal reaction and the concomitant change in resistance.

3. A method according to claim 1 wherein the heat tone sensor is a planar sensor produced according to ceramic film technology.

4. A method according to claim 1 wherein the heat tone sensor has two NTC resistors, and one of the two NTC resistors of the heat tone sensor is an NTC resistor of a lambda probe.

5. A method according to claim 1, wherein said step of taking countermeasures includes shifting the exhaust gas composition in a direction to reduce the overheating of the resistor.

6. A device for protecting a catalytic converter used for purification of exhaust gas streams, comprising:

a heat tone sensor deposed in at least a part of an exhaust gas stream upstream of a catalytic converter in a direction of the exhaust gas flow, said heat tone sensor including at least two NTC or PTC resistors, and a coating of a catalytically active material provided on the sensor in a region of at least one of said resistors, with said catalytically active material initiating identical exothermal reactions as those which take place in the catalytic converter; a bridge circuit including said at least two resisters of said heat tone sensor for detecting a deviation of an exhaust gas composition from a state of equilibrium as a result of a change in resistance in the resistor disposed in the region of the catalytic coating due to overheating of the resistor resulting from an excessive exothermal reaction; and, means for taking countermeasures to reduce the overheating when a preset threshold value for a change in resistance is exceeded by the detected change in resistance.

7. A device according to claim 6 wherein said heat tone sensor has two NTC resistors, and one of said two NTC resistors of said heat tone sensor is an NTC resistor of a lambda sensor.

8. A device according to claim 6 wherein a catalyst material based on Pt or Pt—Rh is used as the catalytically active material.

9. A device according to claim 6, wherein two planar NTC or PTC temperature sensor elements are combined into said heat tone sensor, with at least one of said sensor elements being provided with a coating of the catalytically active material on its surface.

10. A device according to claim 6, wherein the two temperature sensor elements are disposed in a sensor housing and separated from one another by a spacer, with one of said temperature sensor elements being provided with a coating of the catalytically active material and serving to detect the heat tone of the catalytically initiated exhaust gas reactions, while the other of said temperature sensor elements, which is not coated with catalytically active material, serves to indicate the exhaust gas temperature.

11. A device according to claim 10, wherein the spacer separating the two temperature sensor elements from one another is a porously sintering ceramic film.

12. A device according to claim 10, wherein the two temperature sensor elements are arranged parallel to one another.

13. A device according to claim 6 wherein at least one said NTC or PTC temperature sensor element is disposed in a sensor housing and is combined with a λ sensor element, with the internal resistance of the λ sensor element serving as a reference resistance.

14. A device according to claim 13, wherein the λ sensor element is provided with a heater.

15. A device according to claim 6 wherein said means for taking countermeasures includes means for shifting the exhaust gas composition toward the state of equilibrium.

* * * * *

UNITED STATES PATENT AND TRADEMARK OFFICE
CERTIFICATE OF CORRECTION

PATENT NO. : 5,473,304
DATED : December 5, 1995
INVENTOR(S) : Karl-Hermann Friese, Hans-Martin Wiedenmann, and Gerhard Hoetzel It is certified that error appears in the above-indentified patent and that said Letters Patent is hereby corrected as shown below:

On title page of Patent No. 5,473,304 under [22] PCT Filed:, the date should read: --May 27, 1991--.

Signed and Sealed this

Twenty-third Day of April, 1996

Attest:

BRUCE LEHMAN

Attesting Officer

Commissioner of Patents and Trademarks